United States Patent
Ono et al.

(10) Patent No.: US 8,215,099 B2
(45) Date of Patent: Jul. 10, 2012

(54) EXHAUST GAS PURIFICATION DEVICE OF INTERNAL COMBUSTION ENGINE

(75) Inventors: Takahiro Ono, Nagoya (JP); Kazuo Kojima, Nagoya (JP)

(73) Assignee: Denso Corporation, Kariya (JP)

( * ) Notice: Subject to any disclaimer, the term of this patent is extended or adjusted under 35 U.S.C. 154(b) by 631 days.

(21) Appl. No.: 12/392,546

(22) Filed: Feb. 25, 2009

(65) Prior Publication Data
US 2009/0211234 A1    Aug. 27, 2009

(30) Foreign Application Priority Data

Feb. 27, 2008  (JP) .................................. 2008-45977

(51) Int. Cl.
*F02M 25/06* (2006.01)
*F01N 3/00* (2006.01)
(52) U.S. Cl. .............................. 60/278; 60/285; 60/279
(58) Field of Classification Search ................ 60/278, 60/279, 285, 295, 297; 123/568.11, 568.19, 123/568.22
See application file for complete search history.

(56) References Cited

U.S. PATENT DOCUMENTS

| | | | | |
|---|---|---|---|---|
| 5,564,283 A | * | 10/1996 | Yano et al. | 60/274 |
| 6,109,025 A | * | 8/2000 | Murata et al. | 60/297 |
| 6,195,987 B1 | * | 3/2001 | Miyashita | 60/285 |
| 6,240,721 B1 | * | 6/2001 | Ito et al. | 60/274 |
| 6,505,465 B2 | * | 1/2003 | Kanazawa et al. | 60/278 |
| 6,574,956 B1 | * | 6/2003 | Moraal et al. | 60/295 |
| 6,901,746 B2 | * | 6/2005 | Nishiyama et al. | 60/285 |
| 7,137,379 B2 | * | 11/2006 | Sasaki et al. | 123/299 |
| 2002/0100454 A1 | | 8/2002 | Itoyama et al. | |

FOREIGN PATENT DOCUMENTS

| | | |
|---|---|---|
| JP | 2006-249950 | 9/2006 |
| JP | 2006-336518 | 12/2006 |
| JP | 2007-224851 | 9/2007 |

OTHER PUBLICATIONS

Japanese Office Action dated Jul. 5, 2010, issued in corresponding Japanese Application No. 2008-045977, with English translation.

* cited by examiner

*Primary Examiner* — Kenneth Bomberg
*Assistant Examiner* — Abdul Elnoubi
(74) *Attorney, Agent, or Firm* — Nixon & Vanderhye P.C.

(57) ABSTRACT

An exhaust gas purification device of an internal combustion engine having a NOx catalyst provided to an exhaust passage for occluding NOx in a lean atmosphere and for reducing the occluded NOx in a rich atmosphere has an exhaust gas recirculation passage for recirculating the exhaust gas from the exhaust passage to an intake passage, an exhaust gas recirculation valve provided in the exhaust gas recirculation passage, a rich combustion control section for performing rich combustion in the internal combustion engine, and an exhaust gas recirculation valve control section for controlling an opening degree of the exhaust gas recirculation valve to conform a pressure value in the intake passage to a predetermined pressure value while the rich combustion control section performs the rich combustion.

3 Claims, 8 Drawing Sheets

EXHAUST GAS PURIFICATION DEVICE OF INTERNAL COMBUSTION ENGINE

CROSS REFERENCE TO RELATED APPLICATION

This application is based on and incorporates herein by reference Japanese Patent Application No. 2008-45977 filed on Feb. 27, 2008.

BACKGROUND OF THE INVENTION

1. Field of the Invention

The present invention relates to an exhaust gas purification device of an internal combustion engine.

2. Description of Related Art

In some cases, an occlusion reduction type NOx catalyst (a NOx catalyst, a Lean NOx Trap, LNT) is arranged in an exhaust pipe of a diesel engine or the like in order to purify nitrogen oxides (NOx) in exhaust gas. The NOx is occluded to the LNT in a lean atmosphere, which is a basic atmosphere in the diesel engine. If the atmosphere is switched to a rich atmosphere after an interval, the occluded NOx is reduced into the harmless nitrogen and is discharged.

There are known methods for forming the rich atmosphere such as rich combustion for forming a rich gas in an engine cylinder, post-injection for injecting fuel into the cylinder after the combustion is almost completed, and exhaust gas fuel addition for injecting unburned fuel as a reducing agent directly to the LNT by a fuel addition valve provided to the exhaust pipe.

There are various kinds of proposals about improvement of exhaust gas purification performance of the LNT. For example, following Patent document 1 (JP-A-2006-336518) describes that a system equipped with a NOx catalyst determines a degradation state of the NOx catalyst from a sensing value of an oxygen concentration sensor and sets length of a lean period.

As compared to the post-injection or the exhaust gas fuel addition, the rich combustion has following advantages, for example. That is, the rich combustion can supply the reducing agent having relatively high reducing efficiency and requires only small quantity of the added fuel as compared to the post-injection or the exhaust gas fuel addition. However, the rich combustion has a problem of a torque step (torque shock). The problem of the torque step is a problem of difference in the torque value between the lean combustion period and the rich combustion period.

Conventionally, in many cases, the diesel engine is equipped with an EGR pipe for recirculating the exhaust gas from the exhaust pipe to the intake pipe for the purpose of exhaust gas purification. In the case where the EGR pipe is equipped, a problem that has not been considered and that originates from the altitude is added to the problem of the torque step. This problem will be explained below with reference to FIG. 8.

FIG. 8 shows an example of a throttle opening degree Dthr, fresh air quantity Qa, an EGR opening degree Degr, intake pressure Pim and torque Tr in the case where the combustion mode is switched to the rich combustion (RICH) in an interval from time t0 to time t1 during the lean combustion (LEAN). In FIG. 8, H indicates the transition at the high altitude and L indicates the transition at the low altitude. The throttle opening degree Dthr means an opening degree of an intake throttle. The EGR opening degree Degr means an opening degree of an EGR valve.

As shown in FIG. 8, in the rich combustion, the intake throttle is adjusted to a predetermined opening degree smaller than in the lean combustion. Feedback control may be performed to achieve the predetermined opening degree of the intake throttle during the rich combustion. The intake air quantity decreases due to the decrease of the opening degree Dthr of the intake throttle. During the rich combustion, the EGR opening degree Degr is also set to a predetermined opening degree.

Under the above situation, the value of the intake pressure Pim during the rich combustion becomes smaller at the high altitude than at the low altitude because of the decrease of the outside air pressure. FIG. 8 shows the situation where the intake pressure Pim is 80 kPa at the high altitude whereas the intake pressure Pim is 100 kPa at the low altitude. The intake pressure Pim may be a pressure value in an intake manifold. The high altitude may be an altitude that is the highest in a range where running of the vehicle is normally expected and that necessitates catalyst control (NOx reduction) of the LNT. For example, the high altitude may be set as the altitude of 1800 m. 100 kPa and 80 kPa in FIG. 8 are approximate values.

At the high altitude, the sum total value of the fresh air quantity Qa suctioned into the cylinder and the EGR gas quantity Qegr decreases with the reduction in the intake pressure Pim. An example of such the situation is shown in FIG. 9. Pim in FIG. 9 indicates the pressure value in the intake manifold. In the sum total value, the fresh air quantity Qa is decided by the opening degree Dthr of the intake throttle and is the same quantity at both of the high altitude and the low altitude. Therefore, at the high altitude, the EGR gas quantity Qegr decreases with the reduction in the intake pressure Pim as shown in FIG. 9.

It can be assumed that the oxygen concentration is substantially zero in the EGR gas. Therefore, if the EGR gas quantity Qegr decreases, the oxygen concentration in the cylinder increases. Because of the increase of the oxygen concentration, the value of the generated torque Tr increases. Therefore, as shown in FIG. 9, the torque value Tr during the rich combustion in the case of the high altitude is larger than the torque value Tr during the rich combustion at the low altitude. Accordingly, as shown in FIG. 8, even when the torque step between the rich combustion and the lean combustion is avoided at the low altitude, the torque step occurs at the high altitude. Avoidance of such the torque step originating from the problem concerning the altitude has not been taken into consideration in the conventional technologies.

SUMMARY OF THE INVENTION

It is an object of the present invention to provide an exhaust gas purification device of an internal combustion engine that inhibits generation of a torque step between a lean combustion state and a rich combustion state, which can be caused by an influence of altitude where the internal combustion engine is located.

According to an aspect of the present invention, an exhaust gas purification device of an internal combustion engine having a NOx catalyst provided to an exhaust passage for occluding NOx in a lean atmosphere and for reducing the occluded NOx in a rich atmosphere has an exhaust gas recirculation passage, an exhaust gas recirculation valve, a rich combustion control section, and an exhaust gas recirculation valve control section. The exhaust gas recirculation passage recirculates the exhaust gas from the exhaust passage to an intake passage. The exhaust gas recirculation valve is provided in the exhaust gas recirculation passage. The rich combustion control section performs rich combustion in the internal combustion engine. The exhaust gas recirculation valve control section controls an opening degree of the exhaust gas recirculation valve to conform a pressure value in the intake passage to a predetermined pressure value while the rich combustion control section performs the rich combustion.

Thus, in the exhaust gas purification device of the internal combustion engine according to the above aspect of the present invention, the exhaust gas recirculation valve control section controls the opening degree of the exhaust gas recirculation valve to conform the pressure value in the intake passage to the predetermined pressure value during the execution of the rich combustion. Therefore, the intake pressure can be maintained to a constant value regardless of the altitude where the internal combustion engine is located. Accordingly, the fluctuation of the exhaust gas recirculation quantity due to the fluctuation of the intake pressure can be inhibited and the eventual fluctuation of the torque value, which is generated in the internal combustion engine, due to the influence of the altitude can be inhibited. Therefore, the exhaust gas purification device that inhibits the torque step between the lean combustion and the rich combustion, which can be caused by the influence of the altitude, is realized.

According to another aspect of the present invention, the predetermined pressure value is a pressure value in the intake passage in a state where the internal combustion engine is located at a predetermined altitude.

With such the construction, the exhaust gas recirculation valve control section controls the intake pressure during the rich combustion such that the intake pressure coincides with the intake pressure at the predetermined altitude. By equalizing the intake pressure in both of the high altitude and the low altitude, the exhaust gas recirculation quantity is also equalized in both of the high altitude and the low altitude. Thus, the torque value during the rich combustion can be equalized in both of the high altitude and the low altitude. Therefore, the problem of the increase in the torque at the high altitude due to the decrease of the exhaust gas recirculation quantity as in the conventional technology, which is caused by equalizing the opening degree of the exhaust gas recirculation valve in both of the high altitude and the low altitude, can be avoided. Thus, the exhaust gas purification device capable of inhibiting the torque step regardless of the altitude where the internal combustion engine is located is realized.

According to another aspect of the present invention, the exhaust gas purification device further has an intake pressure sensing section for sensing the pressure in the intake passage. The exhaust gas recirculation valve control section has a feedback control section for feeding back the pressure in the intake passage sensed with the intake pressure sensing section, thereby approximating the pressure in the intake passage to the predetermined pressure value.

Thus, the exhaust gas recirculation valve control section controls the opening degree of the exhaust gas recirculation valve to approximate the intake pressure to the predetermined pressure by the feedback control. Accordingly, the intake pressure can be accurately approximated to the predetermined pressure value by the effect of the feedback control.

According to yet another aspect of the present invention, the exhaust gas purification device further has an outside air pressure sensing section for sensing outside air pressure. The exhaust gas recirculation valve control section has a setting section for setting a basic opening degree of the exhaust gas recirculation valve in accordance with the outside air pressure sensed with the outside air pressure sensing section. The exhaust gas recirculation valve control section uses the sum of the basic opening degree set by the setting section and the opening degree provided by the feedback control section as the opening degree of the exhaust gas recirculation valve.

Thus, the opening degree of the exhaust gas recirculation valve is the sum of the basic opening degree set in accordance with the outside air pressure and the opening degree provided by the feedback control section. Therefore, by setting the basic opening degree appropriately in accordance with the outside air pressure, the opening degree of the exhaust gas recirculation valve can be brought to a value close to the desirable opening degree from the beginning of the rich combustion period. Thereafter, the opening degree can be approximated to the further desirable opening degree by the feedback control section. Thus, by the combination of the setting of the basic opening degree by the setting section and the convergence to a steady-state value by the feedback control section, the exhaust gas purification device capable of approximating the opening degree of the exhaust gas recirculation valve to the desirable value with high accuracy over the entire rich period is realized.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
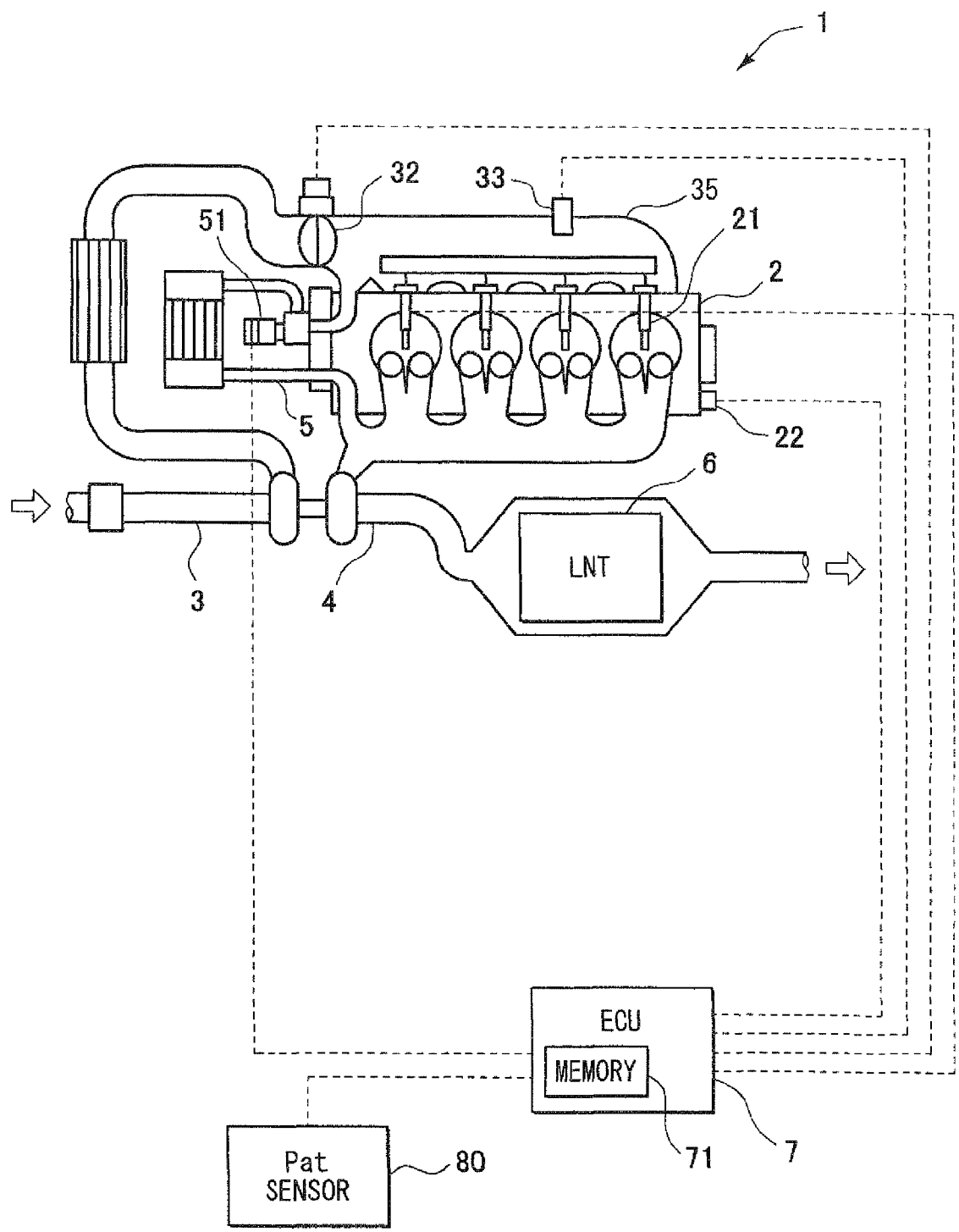
FIG. 1 is a schematic construction diagram showing an exhaust gas purification device of an internal combustion engine according to a first embodiment of the present invention.

Hereafter, embodiments of the present invention will be described with reference to the drawings. FIG. 1 is a schematic diagram showing a device configuration of an exhaust gas purification device 1 of an internal combustion engine according to the first embodiment of the present invention.

The exhaust gas purification device 1 according to the present embodiment is applied to a four-cylinder diesel engine 2 (hereafter, referred to simply as an engine), for example. The internal combustion engine and the exhaust gas purification device 1 shown in FIG. 1 mainly consist of the engine 2, an intake pipe 3, an exhaust pipe 4, and an exhaust gas recirculation pipe 5. It may be assumed that the internal combustion engine and the exhaust gas purification device 1 are mounted in a motor vehicle.

An air (a fresh air, an intake air) passes through the intake pipe 3 and an intake manifold 35 and is supplied to the engine 2. An intake throttle 32 is provided in the intake pipe 3. Intake quantity supplied to the engine 2 is increased/decreased by regulating an opening degree of the intake throttle 32. An intake pressure sensor 33 is provided to the intake manifold 35. The intake pressure sensor 33 senses intake pressure Pim in the intake manifold 35.

The engine 2 is equipped with injectors 21 and an engine rotation speed sensor 22. Fuel is supplied into a cylinder by injection from the injector 21. The engine rotation speed sensor 22 senses rotation time number per unit time (i.e., RPM or rotation speed NE) of the engine 2. The engine rotation speed sensor 22 may be a crank angle sensor for measuring a rotation angle of a crank connected to the engine 2, for example. The sensing value of the crank angle sensor may be sent to an ECU 7, and the engine rotation speed NE (i.e., RPM) of the engine 2 may be calculated.

The exhaust gas recirculation pipe 5 (i.e., an EGR pipe) performs exhaust gas recirculation (EGR) from the exhaust pipe 4 to the intake pipe 3. The EGR pipe 5 is equipped with an EGR valve 51. Exhaust gas recirculation quantity is regulated through opening and closing of the EGR valve 51. By recirculating the exhaust gas through the EGR pipe 5, combustion temperature in the engine 2 is lowered to reduce emission quantity of NOx from the engine 2.

The exhaust gas is discharged to the exhaust pipe 4 connected to the engine 2. An LNT 6 (a NOx catalyst) is equipped in the exhaust pipe 4. For example, the LNT 6 may have a structure, in which a layer of a carrier is formed on a substrate made of ceramics and an occlusion agent and a catalyst are supported on the carrier. For example, if the gamma alumina is used as the carrier, large quantity of the occlusion agent and the catalyst can be suitably supported since concavities and convexities on the surface of the carrier provide a large surface area. The barium, the lithium, the potassium or the like may be used as the occlusion agent, and the platinum or the like may be used as the catalyst.

In the LNT 6, the NOx in the exhaust gas is occluded by the occlusion agent under the condition of a lean atmosphere where the fuel is leaner than the theoretical air-fuel ratio. Normally, an A/F value (an air-fuel ratio value) is 17 or over in the lean atmosphere. If the air-fuel ratio is adjusted to the rich atmosphere where the fuel is excessive as compared to the theoretical air-fuel ratio (the A/F value is normally 14.5 or lower in the rich atmosphere) and a predetermined temperature condition (for example, a condition that the temperature is equal to or higher than 300 degrees C., thereby enabling the catalyst to function) is satisfied, the NOx occluded by the occlusion agent is reduced into the harmless nitrogen by a reducing agent generated from components of the fuel and is discharged. There is a method of rich combustion for forming the rich atmosphere. In the rich combustion, intake air quantity is decreased and main injection quantity of the injector 21 is increased by commands from the ECU 7, thereby forming the rich atmosphere.

The exhaust gas purification device 1 is equipped with an atmospheric pressure sensor 80. The atmospheric pressure sensor 80 is equipped in an engine room or the like to measure the atmospheric pressure Pat (outside air pressure). Measurement values of the intake pressure sensor 33, the engine rotation speed sensor 22 and the atmospheric pressure sensor 80 described above are sent to the electronic control unit 7 (ECU). The ECU 7 controls timing and injection quantity of fuel injection of the injector 21 to the engine 2 and opening degrees of the intake throttle 32 and the EGR valve 51. The ECU 7 may have a structure of an ordinary computer. The ECU 7 may be equipped with a CPU for performing various types of calculation and a memory 71 for storing various types of information.

Figure 2:
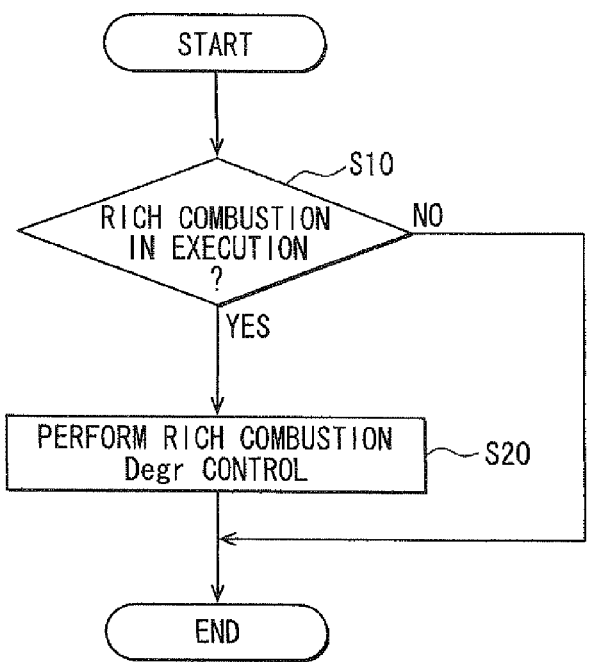
FIG. 2 is a flowchart showing EGR opening degree control processing during rich combustion according to the first embodiment.

In the present embodiment, in the above-described device configuration, control processing of the EGR opening degree Degr during the rich combustion is performed. The EGR opening degree Degr means an opening degree of the EGR valve 51. A processing procedure of the control processing is shown in FIG. 2. The processing shown in FIG. 2 may be sequentially and automatically executed by the ECU 7.

In the processing of FIG. 2, first in S10, it is determined whether the rich combustion is in execution. If the rich combustion is in execution (S10: YES), the process proceeds to S20. If the rich combustion is not in execution (S10: NO), the processing of FIG. 2 is ended. In S20, EGR opening degree control during the rich combustion is performed.

Figure 3:
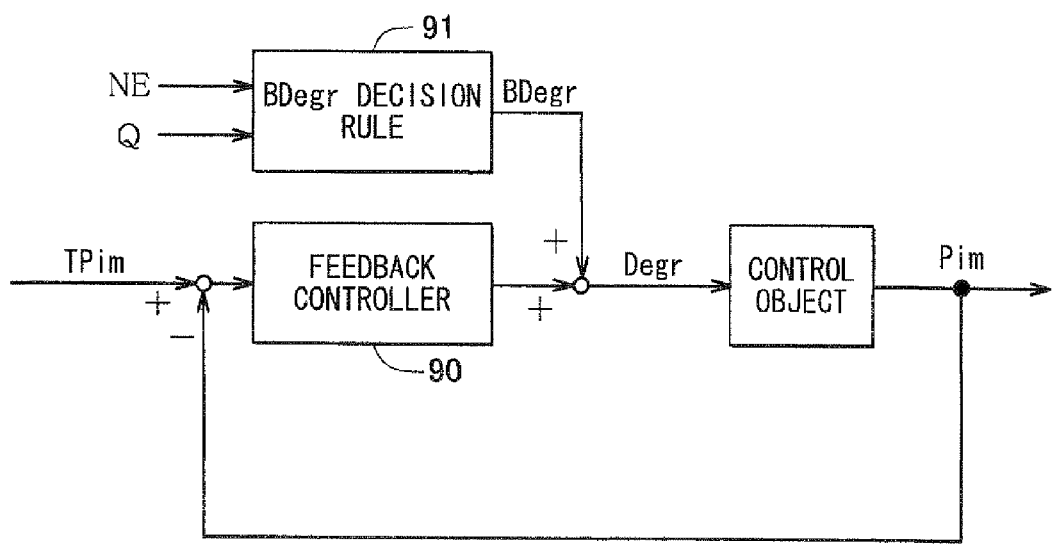
FIG. 3 is a block diagram showing a feedback control system according to the first embodiment.

The EGR opening degree control during the rich combustion in S20 is performed by a control system shown in FIG. 3. In the control system of FIG. 3, a part shown in FIG. 1, whose input is the EGR opening degree Degr and whose output is the intake pressure Pim measured by the intake pressure sensor 33, is employed as a control object. In the present embodiment, the opening degree of the intake throttle 32 during the rich combustion is decided beforehand. Therefore, a characteristic of the control object in FIG. 3 may be a characteristic from the EGR opening degree Degr to the intake pressure Pim in the case where the opening degree of the intake throttle 32 is set at a predetermined opening degree as of the rich combustion.

In FIG. 3, the EGR opening degree Degr is a value calculated by adding an output of a feedback controller 90 to an EGR base opening degree BDegr (a basic opening degree), which is the standard EGR opening degree. The EGR base opening degree BDegr may be the same as the EGR opening degree Degr as of the rich combustion in FIG. 8. The EGR base opening degree BDegr is decided by a base opening degree decision rule 91 (i.e., a base opening degree decision routine) from the engine rotation speed NE and the fuel injection quantity Q of the engine 2. The engine rotation speed NE may be sensed with the engine rotation speed sensor 22. A command value of the fuel injection quantity sent from the ECU 7 to the injector 21 may be used as the fuel injection quantity Q.

The base opening degree decision rule 91 may be decided and stored in the memory 71 beforehand. Then, the stored base opening degree decision rule 91 may be used. For example, a map created by dividing a plane defined by coordinate axes of the engine rotation speed NE and the fuel injection quantity Q into multiple areas beforehand and by deciding the EGR base opening degree BDegr for each area beforehand may be used as the base opening degree decision rule 91.

A difference between target intake pressure TPim and the fed-back intake pressure Pim is used as an input to the feedback controller 90 of FIG. 3. The intake pressure Pim may be measured with the intake pressure sensor 33 as mentioned above. The target intake pressure TPim is set beforehand as a value unrelated to the altitude so that a torque step due to a difference in the altitude is not caused during the rich combustion.

Figure 8:
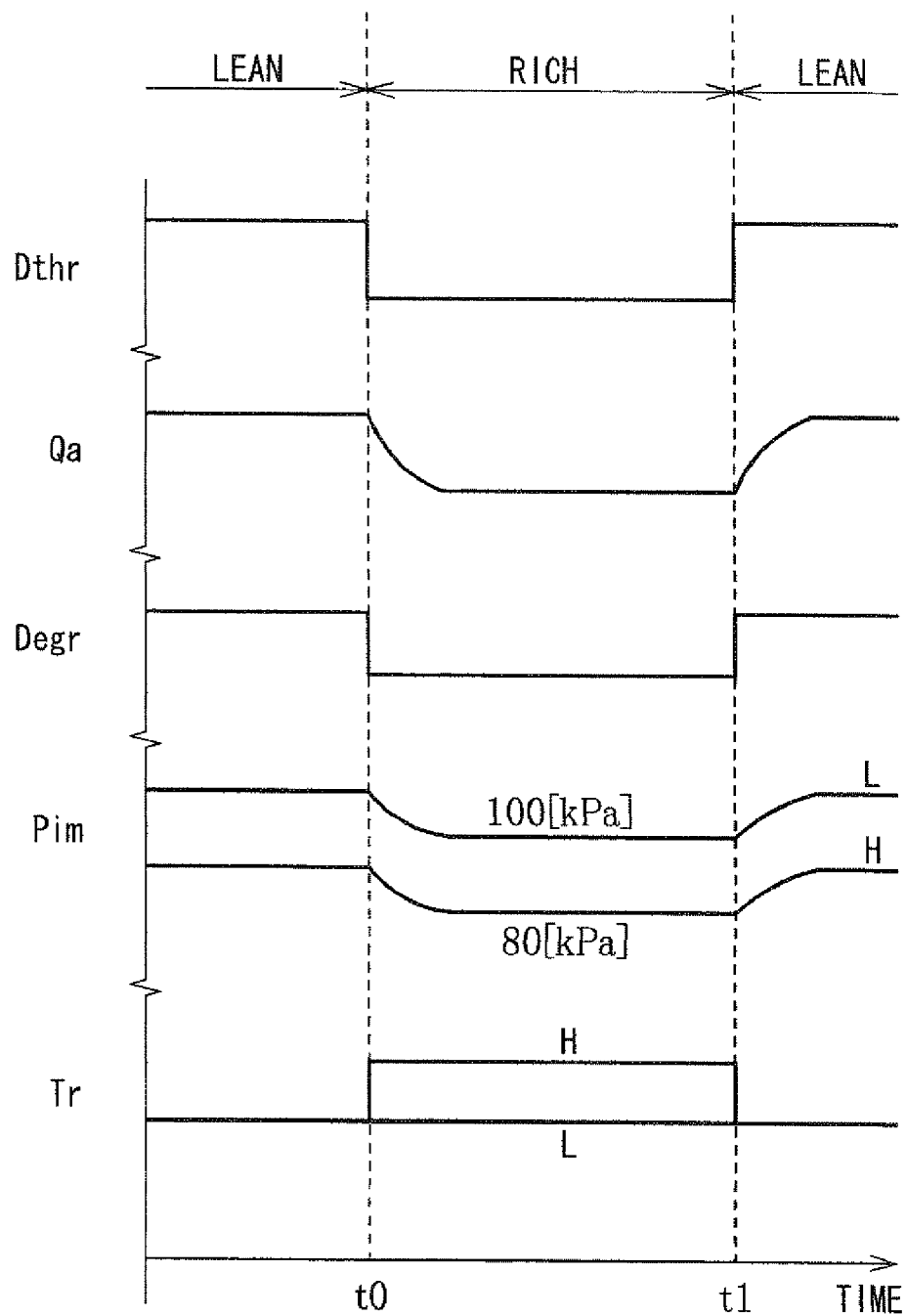
FIG. 8 is a diagram showing temporal transitions of a throttle opening degree, fresh air quantity, an EGR opening degree, intake pressure and torque of a related art.
Figure 9:
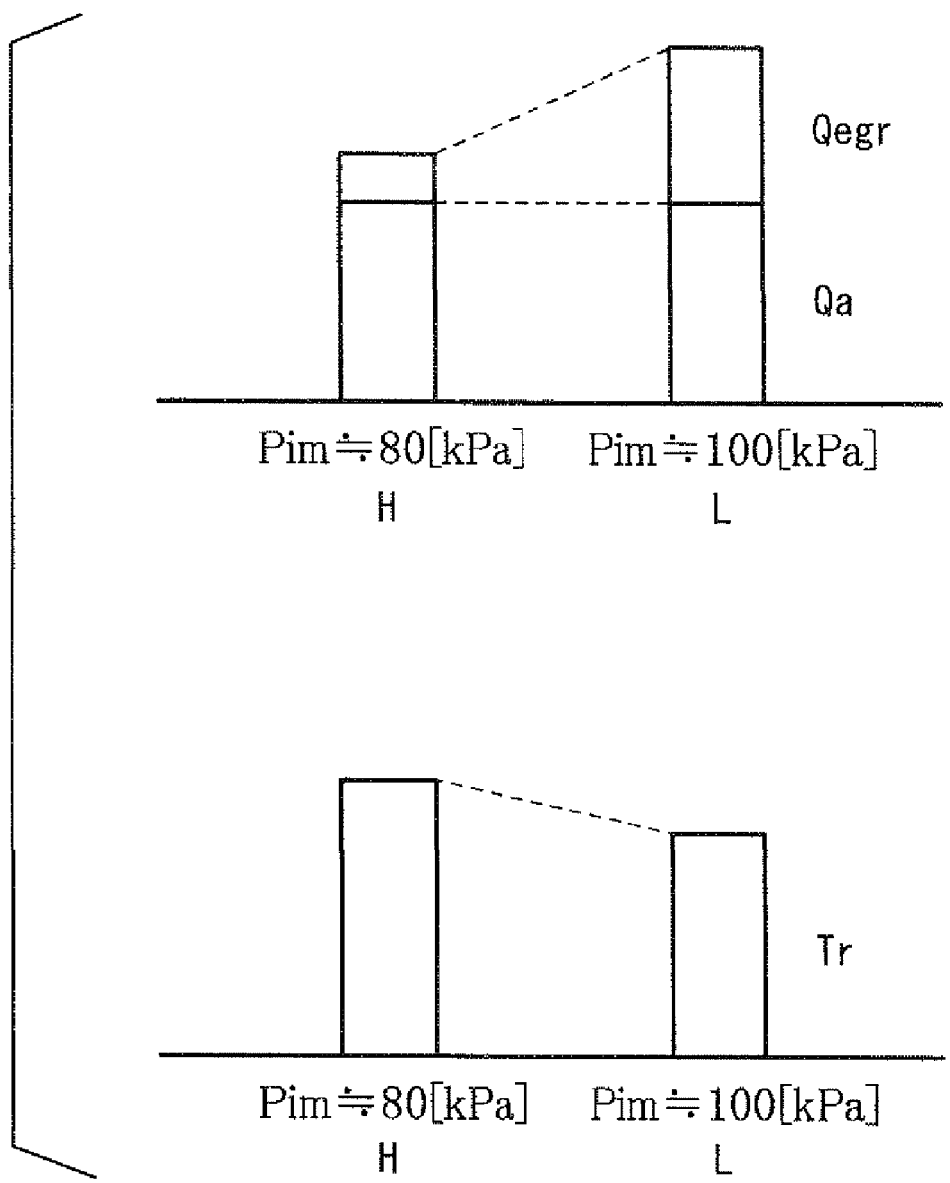
FIG. 9 is a diagram showing values of EGR gas quantity, the fresh air quantity and the torque at different values of intake pressure of the related art.

More specifically, the target intake pressure TPim is set at a value of the intake pressure Pim attainable by the adjustment of the EGR opening degree Degr in a state where the exhaust gas purification device 1 is located at the altitude that is the highest in a range where running of the vehicle is normally expected and that necessitates catalyst control of the LNT 6. Therefore, for example, the target intake pressure TPim may be set at 80 kPa shown in FIG. 8. Since 80 kPa of FIG. 8 is the value of the intake pressure Pim in the case where the EGR opening degree Degr is set at a certain value, the target intake pressure TPim may be set at a value of the intake pressure Pim at the time when the EGR opening degree Degr is increased further (i.e., at a value higher than 80 kPa).

The feedback controller 90 of FIG. 3 is a PI controller (proportional-integral controller) or a PID controller (a proportional-integral-derivative controller), for example. The feedback controller 90 may be beforehand designed to stabilize the feedback system of FIG. 3 and may be used in S20. In the case where the PI controller or the PID controller is used, the intake pressure Pim can be conformed to the target intake pressure TPim in a stationary state with an integral element included in the controller if the target intake pressure TPim is a constant value.

As mentioned above, the processing of S20 of the present embodiment is performed in the control system of FIG. 3 by maintaining the target intake pressure TPim constant regardless of the altitude. That is, the target intake pressure TPim of FIG. 3 is set at the same value regardless of whether the exhaust gas purification device 1 is at the high altitude or at the low altitude. Thus, the target value of the intake pressure Pim is set at the same value regardless of the altitude of the exhaust gas purification device 1. Accordingly, the quantity of the recirculated exhaust gas (i.e., the EGR quantity) can be also maintained the same regardless of the altitude. Therefore, the torque value during the rich combustion is also the same value regardless of the altitude.

Figure 4:
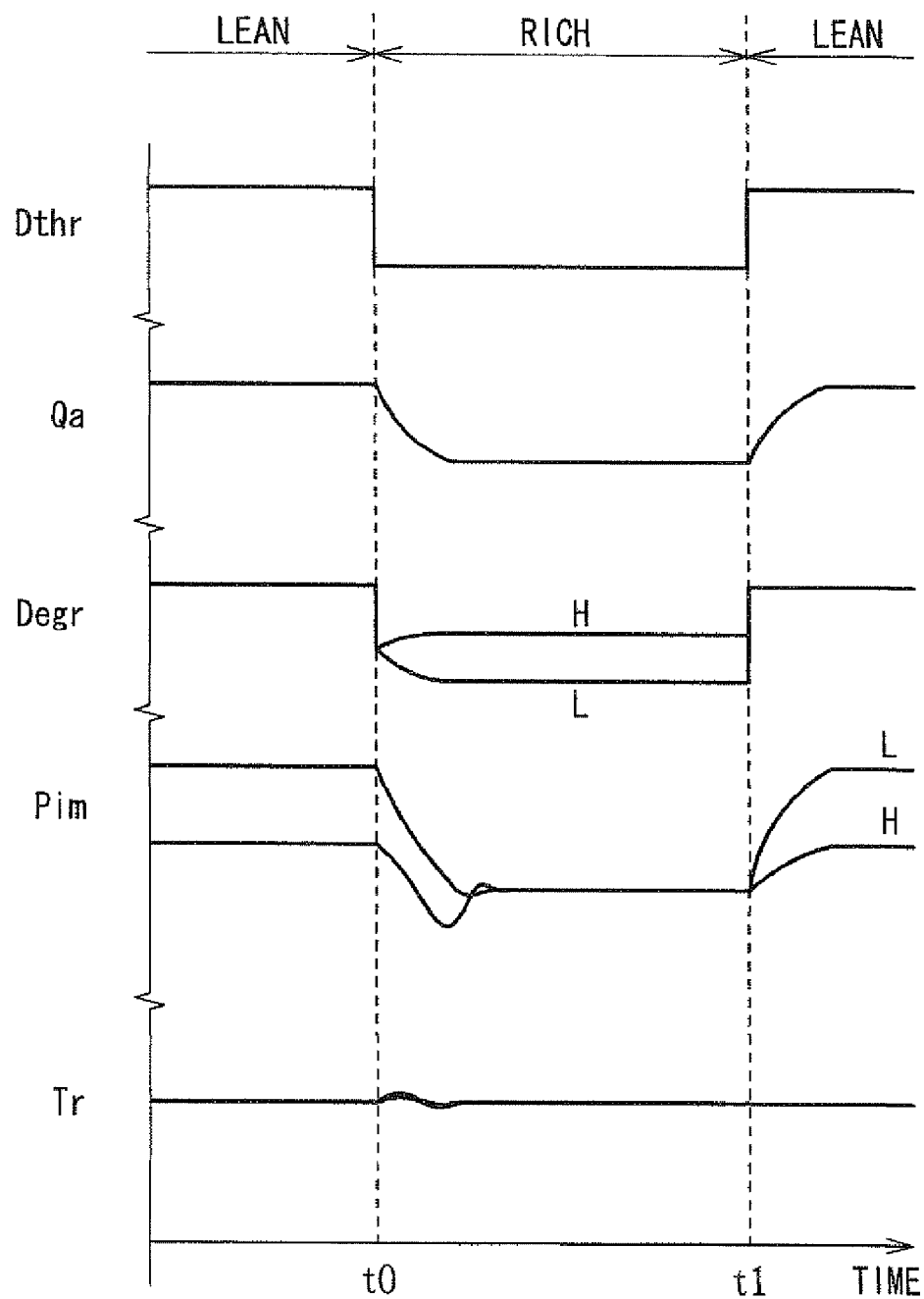
FIG. 4 is a diagram showing temporal transitions of a throttle opening degree, fresh air quantity, an EGR opening degree, intake pressure and torque according to the first embodiment.

An example of such the operation is shown in FIG. 4. FIG. 4 shows temporal transitions of the throttle opening degree Dthr, the fresh air quantity Qa, the EGR opening degree Degr, the intake pressure Pim and torque Tr in the case where the combustion mode is switched from the lean combustion (LEAN) to the rich combustion (RICH) according to the first embodiment. In FIG. 4, H indicates the transition at the high altitude and L indicates the transition at the low altitude. The transitions of the throttle opening degree Dthr and the fresh air quantity Qa are the same as FIG. 8 showing the case of the related art. Because of the processing of S20 and the control of FIG. 3, the intake pressure Pim during the rich combustion converges to a steady-state value regardless of the altitude after transient response after time t0. The steady-state value is the target intake pressure TPim of FIG. 3.

Accordingly, the EGR opening degree Degr also fluctuates as shown in FIG. 4. As shown in FIG. 4, the EGR opening degree Degr first changes to a certain opening degree immediately after the time t0. This opening degree is the above-mentioned EGR base opening degree BDegr and is the same as the opening degree during the rich combustion in FIG. 8. Thereafter, the EGR opening degree Degr during the rich combustion converges to the steady-state value due to the effect of the feedback control. As shown in FIG. 4, in the case of the low altitude, the EGR opening degree Degr during the rich combustion changes to a narrower side (i.e., more closed side) than the EGR base opening degree BDegr. In the case of the high altitude, the EGR opening degree Degr during the rich combustion changes to a wider side (i.e., more opened side) than the EGR base opening degree BDegr. Therefore, the steady-state value of the EGR opening degree Degr during the rich combustion becomes larger in the case of the high altitude than in the case of the low altitude.

Through the above control, the fresh air quantity Qa and the EGR gas quantity during the rich combustion are the same quantities respectively in both of the high altitude and the low altitude. Therefore, as shown in FIG. 4, the steady-state value of the torque Tr during the rich combustion is the same value in both of the high altitude and the low altitude. Thus, when the torque step between the rich combustion and the lean combustion is avoided at the low altitude, the torque step can be avoided also at the high altitude. The torque value Tr during the lean combustion in FIG. 4 may be a torque value that is obtained by adjusting the throttle opening degree Dthr and the EGR opening degree Degr to conform the torque value Tr to the torque value Tr as of the rich combustion.

Next, a second embodiment of the present invention will be explained. In the second embodiment, the EGR base opening degree BDegr of the first embodiment is corrected using the atmospheric pressure Pat. Next, only points different from the first embodiment will be explained. In the second embodiment, the control system of FIG. 3 is replaced with a control system of FIG. 5.

Figure 5:
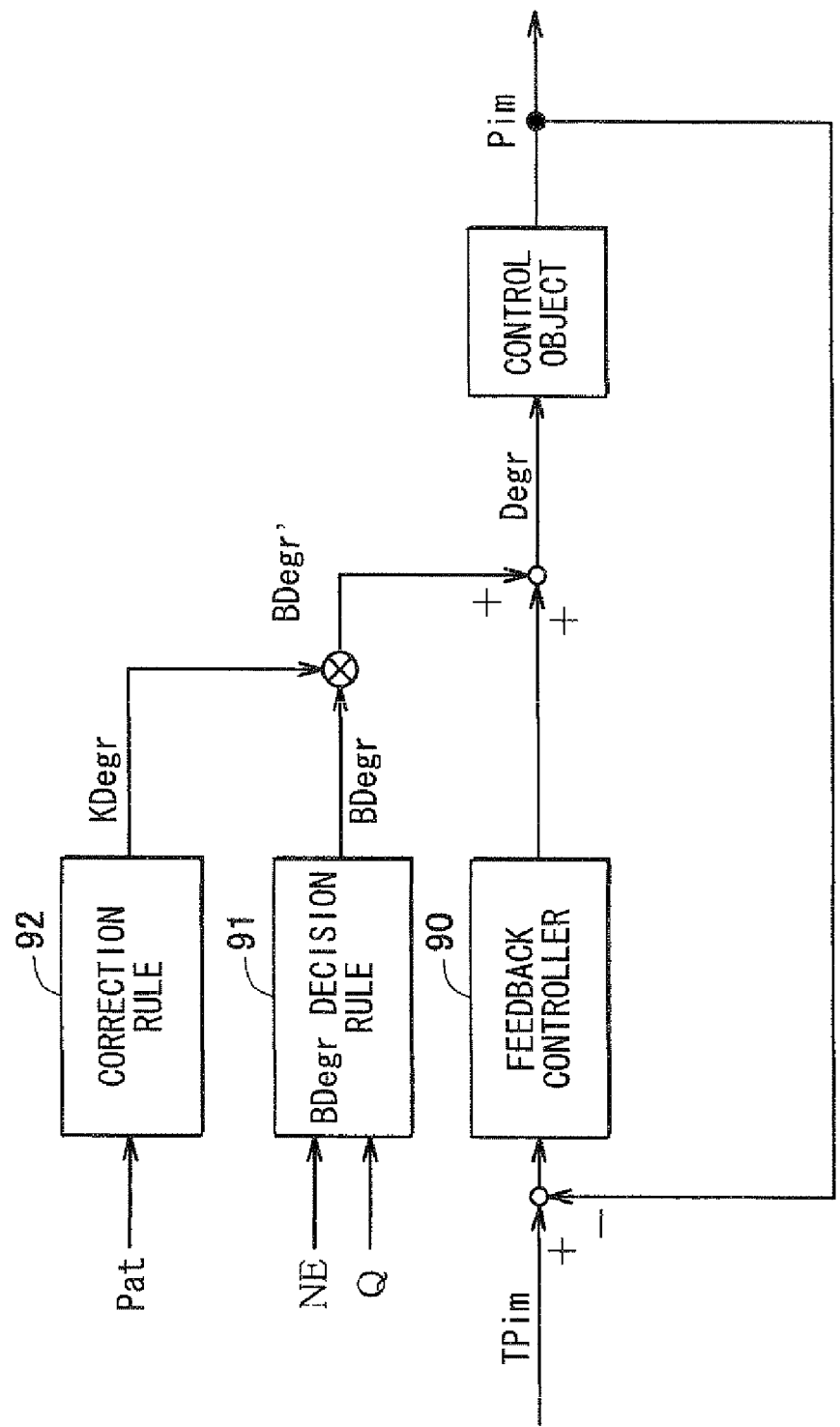
FIG. 5 is a block diagram showing a feedback control system according to a second embodiment of the present invention.

In the control system of FIG. 5, the EGR base opening degree BDegr is multiplied by an EGR opening degree correction coefficient KDegr to obtain a corrected EGR base opening degree BDegr', and the output value of the feedback controller 90 is added to the corrected EGR base opening degree BDegr' to decide the EGR opening degree Degr. The EGR opening degree correction coefficient KDegr is decided by a correction rule 92 (i.e., a correction routine) using the atmospheric pressure Pat. The atmospheric pressure Pat may be measured with the atmospheric pressure sensor 80 and the measurement value may be sent to the ECU 7.

Figure 6:
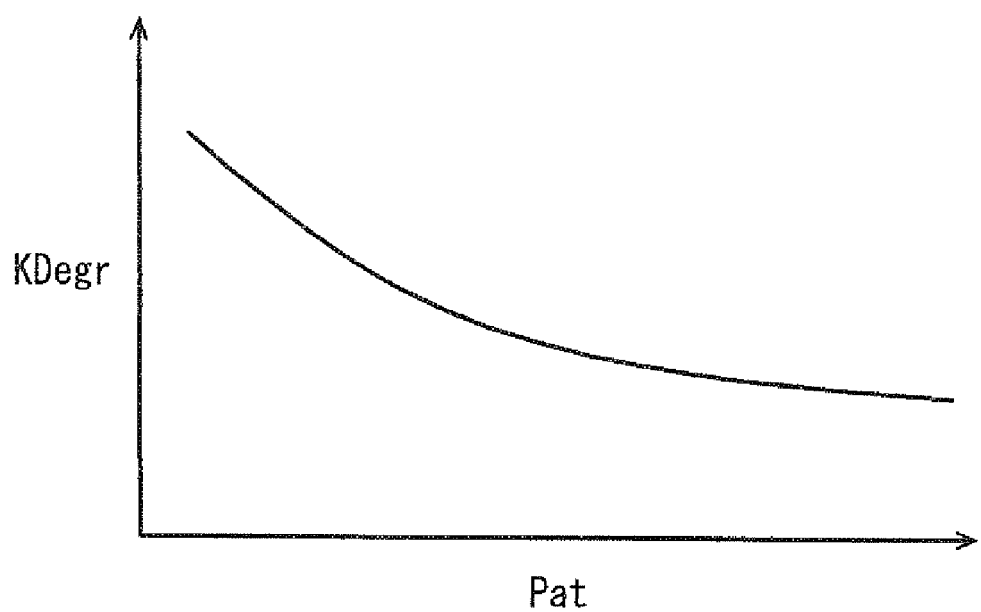
FIG. 6 is a diagram showing an example of a correction rule according to the second embodiment.

An example of the correction rule 92 is shown in FIG. 6. That is, the EGR opening degree correction coefficient KDegr is decreased as the atmospheric pressure Pat increases for a following reason. If the value of the atmospheric pressure Pat is high, discharge of the exhaust gas from the exhaust pipe 4 to a space outside the vehicle, where the pressure is high, is hindered. Accordingly, the gas quantity allotted to the EGR increases. Therefore, as mentioned above, when it is desired to maintain the EGR gas quantity constant at both of the low altitude and the high altitude, it is necessary to narrow the EGR opening degree Degr more as the atmospheric pressure Pat increases. From such the concept, the correction rule 92 of FIG. 6 is obtained. The correction rule is not limited to the curve shown in FIG. 6. The correction rule may be set arbitrarily within a range of monotonically decreasing functions.

Figure 7:
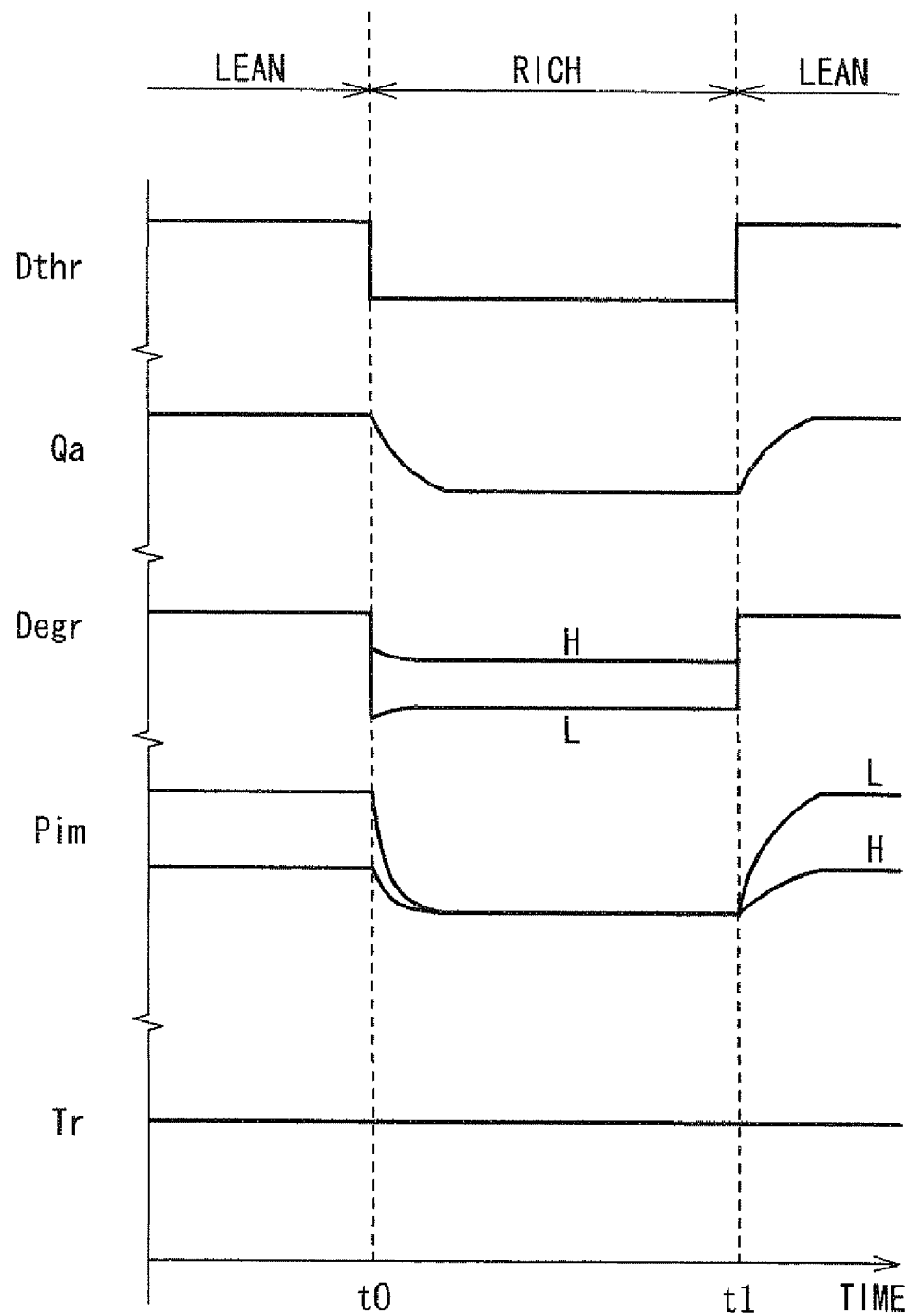
FIG. 7 is a diagram showing temporal transitions of a throttle opening degree, fresh air quantity, an EGR opening degree, intake pressure and torque according to the second embodiment.

In the second embodiment, the EGR opening degree Degr can be approximated to the steady-state value more quickly (or the intake pressure Pim can be approximated to the target intake pressure TPim more quickly) by correcting the EGR base opening degree BDegr using the correction rule 92 of FIG. 6. An example of such the operation is shown in FIG. 7. FIG. 7 shows temporal transitions of the throttle opening degree Dthr, the fresh air quantity Qa, the EGR opening degree Degr, the intake pressure Pim and the torque Tr in the case where the combustion mode is switched from the lean combustion (LEAN) to the rich combustion (RICH) according to the second embodiment.

As mentioned above, in FIG. 4, the EGR opening degree Degr becomes the EGR base opening degree BDegr (which is not corrected) immediately after the time t0 and thereafter converges to the steady-state value due to the effect of the feedback control. Accordingly, in FIG. 4, also the intake pressure Pim settles at the steady-state value in the rich combustion state after a certain transient response after the time t0. Due to the influence of these phenomena, the torque value Tr in the rich combustion also shows a transitional behavior after the time t0 until the torque value Tr converges to the steady-state value.

In contrast, in FIG. 7, due to the effect of the correction using the EGR opening degree correction coefficient KDegr, the EGR base opening degree BDegr is corrected in accordance with the altitude. Therefore, in the both cases of the high altitude and the low altitude, the EGR opening degree Degr immediately after the time t0 becomes the corrected EGR base opening degree BDegr'. As shown in FIG. 7, in each of the high altitude and the low altitude, the corrected EGR base opening degree BDegr' becomes a value close to the steady-state value of each of the high altitude and the low altitude respectively. Therefore, the degree of the converging operation of the EGR opening degree Degr to the steady-state value by the feedback control thereafter is similar to the degree of fine adjustment of the EGR opening degree Degr.

Thus, because the EGR opening degree Degr is close to the steady-state value even immediately after the time t0, the intake pressure Pim also converges to the steady-state value more quickly as shown in FIG. 7 than in FIG. 4. Accordingly, transitional behaviors of the EGR opening degree Degr and the intake pressure Pim during the rich combustion are small. Therefore, in the case of FIG. 7, the transitional behavior of the torque value Tr during the rich combustion is negligible. Also, the torque step between the rich combustion and the lean combustion is suppressed substantially thoroughly. The above is the second embodiment.

In the above embodiments, the ECU 7 constitutes a rich combustion control section. The procedure of S20 constitutes an exhaust gas recirculation valve control section. The intake pressure sensor 33 constitutes an intake pressure sensing section. The feedback controller 90 constitutes a feedback control section. The atmospheric pressure sensor 80 constitutes an outside air pressure sensing section. The base opening degree decision rule 91 and the correction rule 92 constitute a setting section. It is not necessary to equip the atmospheric pressure sensor 80 in the first embodiment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust gas purification device of an internal combustion engine having a NOx catalyst provided to an exhaust passage for occluding NOx in a lean atmosphere and for reducing the occluded NOx in a rich atmosphere, the exhaust gas purification device comprising:
    an exhaust gas recirculation passage for recirculating the exhaust gas from the exhaust passage to an intake passage;
    an exhaust gas recirculation valve provided in the exhaust gas recirculation passage;
    a rich combustion controller for performing rich combustion in the internal combustion engine;
    an exhaust gas recirculation valve controller for controlling an opening degree of the exhaust gas recirculation valve to conform a pressure value in the intake passage to a predetermined pressure value while the rich combustion controller performs the rich combustion;
    an intake pressure sensor for sensing the pressure in the intake passage; and
    an outside air pressure sensor for sensing outside air pressure, wherein:
    the exhaust recirculation valve controller has a feedback controller for feeding; back the pressure in the intake passage sensed with the intake pressure sensor, thereby approximating the pressure in the intake to the predetermined pressure value,
    the exhaust gas recirculation valve controller has a setting unit for setting a basic opening degree of the exhaust gas recirculation valve in accordance with the outside air pressure sensed with the outside air pressure sensor, and
    the exhaust gas recirculation valve controller uses the sum of the basic opening degree set by the setting unit and the opening degree provided by the feedback controller as the opening degree of the exhaust gas recirculation valve.

2. The exhaust gas purification device as in claim 1, wherein
    the predetermined pressure value is a pressure value in the intake passage in a state where the internal combustion engine is located at a predetermined altitude.

3. The exhaust gas purification device as in claim 1, wherein
    the setting unit sets the basic opening degree of the exhaust gas recirculation valve to be smaller as the sensed outside air pressure increases.

* * * * *